US012618523B2

(12) United States Patent
Sakaguchi et al.

(10) Patent No.: US 12,618,523 B2
(45) Date of Patent: May 5, 2026

(54) LIQUID TANK, ROCKET, AND METHOD OF MANUFACTURING LIQUID TANK

(71) Applicants: IHI Corporation, Tokyo (JP); MJOLNIR SPACEWORKS Co., Ltd., Sapporo (JP)

(72) Inventors: Yoshiki Sakaguchi, Kashiwara (JP); Masahiko Yamazaki, Kashiwara (JP); Shinichi Mishima, Kashiwara (JP); Thibault Bagnol, Tokyo (JP); Mitsunori Itoh, Tokyo (JP); Tor Viscor, Sapporo (JP)

(73) Assignees: IHI Corporation, Tokyo (JP); MJOLNIR SPACEWORKS Co., Ltd., Sapporo (JP)

( * ) Notice: Subject to any disclaimer, the term of this patent is extended or adjusted under 35 U.S.C. 154(b) by 98 days.

(21) Appl. No.: 18/523,093

(22) Filed: Nov. 29, 2023

(65) Prior Publication Data

US 2024/0102614 A1 Mar. 28, 2024

Related U.S. Application Data

(63) Continuation of application No. PCT/JP2022/022288, filed on Jun. 1, 2022.

(30) Foreign Application Priority Data

Jun. 1, 2021 (JP) ................................. 2021-092569

(51) Int. Cl.
*F17C 13/00* (2006.01)
*B21D 22/14* (2006.01)
(Continued)

(52) U.S. Cl.
CPC ............ *F17C 13/008* (2013.01); *B21D 22/14* (2013.01); *B21D 51/18* (2013.01); *B64G 1/4021* (2023.08);
(Continued)

(58) Field of Classification Search
CPC ....... B60K 2015/0775; F17C 2260/016; F17C 13/008; F17C 2201/0109; F17C 2209/232;
(Continued)

(56) References Cited

U.S. PATENT DOCUMENTS 2,379,126 A * 6/1945 Welden .................. B64D 37/06
220/560.04
2,552,119 A * 5/1951 Scharenberg .......... B64D 37/06
220/666
(Continued)

FOREIGN PATENT DOCUMENTS

CN 204805946 U 11/2015
JP 2011-20880 A 2/2011
(Continued)

*Primary Examiner* — Laura E. Parker
(74) *Attorney, Agent, or Firm* — Rothwell, Figg, Ernst & Manbeck, P.C.

(57) ABSTRACT

Provided is a liquid tank, including: a cylindrical seamless tank body having both end portions being reduced in diameter toward respective end sides; and a plurality of annular baffles provided inside the tank body and arranged at intervals in an axial direction of the tank body, in which at least one of the plurality of baffles is held on an inner peripheral surface of the tank body.

9 Claims, 6 Drawing Sheets

(51) Int. Cl.

*B21D 51/18* (2006.01)

*B64G 1/40* (2006.01)

(52) U.S. Cl.

CPC ............................ *F17C 2201/0109* (2013.01); *F17C 2209/232* (2013.01); *F17C 2270/0197* (2013.01)

(58) Field of Classification Search

CPC ........ F17C 2270/0197; F17C 2201/054; F17C 2203/013; F17C 2203/0617; F17C 2221/011; F17C 2221/08; F17C 2223/0161; F17C 2223/033; B21D 22/14; B21D 51/18; B64G 1/4021; B64G 1/40

USPC ................................................. 220/563, 581

See application file for complete search history.

(56) References Cited

U.S. PATENT DOCUMENTS

| | | | |
|---|---|---|---|
| 2005/0211573 A1 | 9/2005 | Myasnikov et al. | |
| 2006/0145022 A1 | 7/2006 | Buehler | |
| 2011/0214410 A1 | 9/2011 | Yamamoto et al. | |
| 2015/0338023 A1 | 11/2015 | Coors et al. | |
| 2017/0283096 A1 | 10/2017 | Kawahara et al. | |
| 2017/0299120 A1 | 10/2017 | Stachulla et al. | |
| 2018/0281992 A1* | 10/2018 | Manning | F17C 13/008 |
| 2019/0360431 A1* | 11/2019 | Baekby Bjarnoe | F02K 9/605 |
| 2022/0258600 A1* | 8/2022 | Embler | F02K 9/605 |
| 2022/0290817 A1* | 9/2022 | Godard | F17C 13/002 |

FOREIGN PATENT DOCUMENTS

| | | | |
|---|---|---|---|
| JP | 2011-183841 A | 9/2011 | |
| JP | 2017-517705 A | 6/2017 | |
| JP | 2017-133693 A | 8/2017 | |
| JP | 6433100 B2 | 12/2018 | |
| JP | 2019-513608 A | 5/2019 | |
| JP | 2019-197073 A | 11/2019 | |
| WO | 2018/130616 A1 | 7/2018 | |

* cited by examiner

LIQUID TANK, ROCKET, AND METHOD OF MANUFACTURING LIQUID TANK

CROSS REFERENCE TO RELATED APPLICATIONS

This application is a continuation application of International Application No. PCT/JP2022/022288, filed on Jun. 1, 2022, which claims priority to Japanese Patent Application No. 2021-92569, filed on Jun. 1, 2021, the entire contents of which are incorporated by reference herein.

BACKGROUND ART

Technical Field

The present disclosure relates to a liquid tank, a rocket, and a method of manufacturing a liquid tank. The present application claims the benefit of priority based on Japanese Patent Application No. 2021-92569 filed on Jun. 1, 2021, and the content thereof is incorporated herein by reference.

Related Art

A liquid tank that accommodates a liquid is used in various devices or various facilities. For example, in Patent Literature 1, there is a disclosure of a hybrid rocket including an oxidant tank that accommodates a liquid oxidant.

CITATION LIST

Patent Literature

Patent Literature 1: JP 2011-020880 A

SUMMARY

Technical Problem

In a related-art liquid tank in various devices or various facilities, the manufacturing process may become redundant due to the presence of a seam caused by welding, bolt fastening, or the like. For example, the manufacturing process of a liquid tank may tend to become redundant due to, for example, the necessity for designing in consideration of a weak point and a defect of welding.

An object of the present disclosure is to provide a liquid tank, a rocket, and a method of manufacturing a liquid tank that enable shortening of the manufacturing process of a liquid tank.

Solution to Problem

In order to solve the above-mentioned problem, according to the present disclosure, there is provided a liquid tank, including: a cylindrical seamless tank body having both end portions being reduced in diameter toward respective end sides; and a plurality of annular baffles provided inside the tank body and arranged at intervals in an axial direction of the tank body, in which at least one of the plurality of baffles is held on an inner peripheral surface of the tank body.

The at least one of the plurality of baffles may be clamped by the inner peripheral surface of the tank body.

The plurality of baffles may be connected to each other by a connecting member extending in the axial direction.

Baffles located at both ends in the axial direction among the plurality of baffles may be held on the inner peripheral surface of the tank body.

An inclined surface inclined with respect to the axial direction may be formed on a surface other than an outer peripheral surface of the baffle held on the inner peripheral surface of the tank body among the plurality of baffles.

The plurality of baffles may include a baffle having an outer peripheral surface spaced apart from the inner peripheral surface of the tank body.

In order to solve the above-mentioned problem, according to the present disclosure, there is provided a rocket including the above-mentioned liquid tank.

In order to solve the above-mentioned problem, according to the present disclosure, there is provided a method of manufacturing a liquid tank, including: installing a plurality of annular baffles inside a cylindrical blank pipe at intervals in an axial direction of the blank pipe; and after installing the plurality of baffles inside the blank pipe, reducing both end portions of the blank pipe in diameter toward respective end sides to form a seamless tank body.

Effects of Disclosure

According to the present disclosure, a manufacturing process of the liquid tank can be shortened.

DESCRIPTION OF EMBODIMENTS

An embodiment of the present disclosure is described below with reference to the accompanying drawings. Dimensions, materials, other specific numerical values, and the like described in the embodiment are merely examples for facilitating understanding, and do not limit the present disclosure unless otherwise stated. In this Description and the drawings, elements having substantially the same functions and configurations are denoted by the same reference symbols to omit overlapping description, and elements that are not directly related to the present disclosure are not shown.

Figure 1:
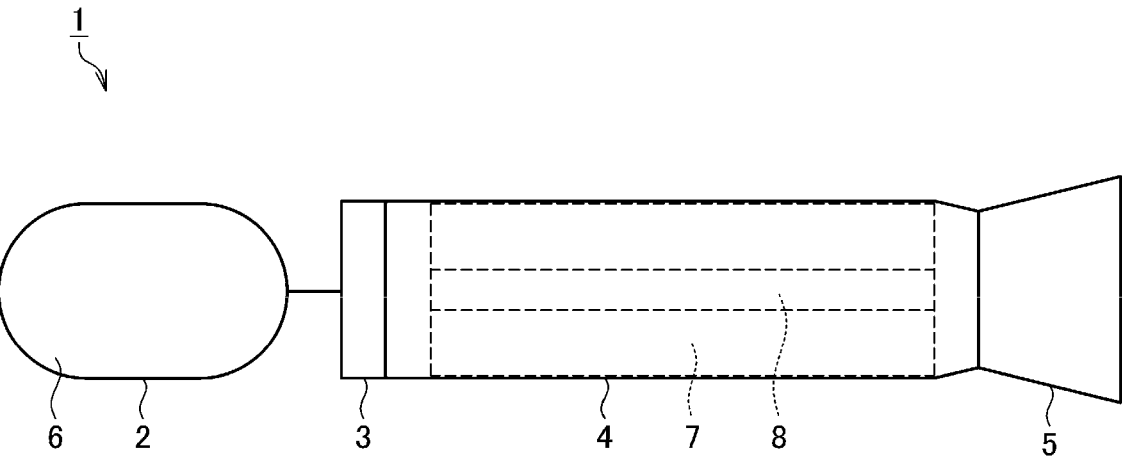
FIG. 1 is a schematic view for illustrating a rocket according to this embodiment.

FIG. 1 is a schematic view for illustrating a rocket 1 according to this embodiment. The rocket 1 is a hybrid rocket. As illustrated in FIG. 1, the rocket 1 includes an oxidant tank 2, an injector plate 3, an engine casing 4, and a nozzle 5.

The oxidant tank 2 corresponds to an example of a liquid tank of the present disclosure. Alternatively, as described later, the liquid tank of the present disclosure may be a liquid tank of a rocket other than a hybrid rocket, or may be a liquid tank of a device other than a rocket.

The oxidant tank 2 accommodates an oxidant 6 that is a liquid. Examples of the oxidant 6 include liquid oxygen, hydrogen peroxide, nitrogen tetroxide, nitrous oxide, and the like. The oxidant tank 2 is connected to one end portion (left end portion in FIG. 1) of the cylindrical engine casing 4 through intermediation of the injector plate 3. The oxidant 6 accommodated in the oxidant tank 2 is jetted into the engine casing 4 from a jetting port (not shown) formed in the injector plate 3.

A solid fuel 7 is accommodated in the engine casing 4. Examples of the solid fuel 7 include hydroxyl-terminated polybutadiene (HTPB), HTPB mixed with carbon black (that is, carbon fine particles), and the like. A through hole 8 extending in an axial direction of the engine casing 4 is formed in the solid fuel 7. When the oxidant 6 is jetted into the engine casing 4, the solid fuel 7 is combusted. Specifically, when the oxidant 6 flows through the through hole 8 of the solid fuel 7, combustion is performed on a side wall of the through hole 8 to generate a combustion gas.

The nozzle 5 is connected to another end portion (right end portion in FIG. 1) of the engine casing 4. The combustion gas generated within the engine casing 4 is jetted from the nozzle 5. Thus, the thrust of the rocket 1 is obtained.

The configuration of the oxidant tank 2 is described below in detail with reference to FIG. 2 and FIG. 3.

Figure 2:
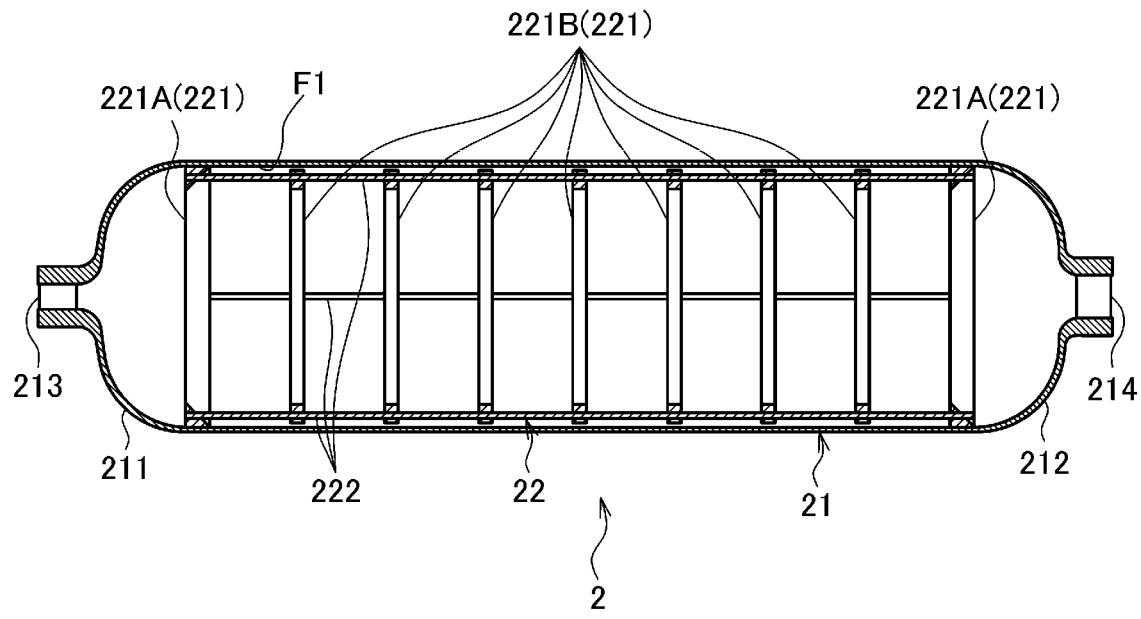
FIG. 2 is a sectional view for illustrating an oxidant tank according to this embodiment.

FIG. 2 is a sectional view for illustrating the oxidant tank 2 according to this embodiment. FIG. 3 is an enlarged sectional view for illustrating the oxidant tank 2 according to this embodiment. FIG. 3 is an enlarged sectional view for illustrating a portion on a left side of FIG. 2 of the oxidant tank 2. As illustrated in FIG. 2, the oxidant tank 2 includes a tank body 21 and a baffle structure 22. An axial direction of the tank body 21, a circumferential direction of the tank body 21, and a radial direction of the tank body 21 are hereinafter simply referred to as "axial direction", "circumferential direction", and "radial direction."

The tank body 21 accommodates the oxidant 6 that is a liquid. The tank body 21 is formed in a seamless manner. That is, the tank body 21 does not have a seam caused by welding, bolt fastening, or the like. The shape of the tank body 21 is a cylindrical shape in which both end portions 211 and 212 are reduced in diameter toward respective end sides. The tank body 21 is formed by, for example, spinning as described later.

An opening 213 is formed at a distal end of the end portion 211 (left end portion in FIG. 2) of the tank body 21. An opening 214 is formed at a distal end of the end portion 212 (right end portion in FIG. 2) of the tank body 21. Other members (for example, a stopper or a pipe) are connected to the openings 213 and 214.

The baffle structure 22 is provided inside the tank body 21. The baffle structure 22 is a structure for suppressing sloshing of the oxidant 6 inside the tank body 21. The baffle structure 22 includes a plurality of baffles 221 and connecting members 222.

The baffle 221 is an annular member. The plurality of baffles 221 are arranged at intervals in the axial direction of the tank body 21. The plurality of baffles 221 are arranged coaxially. Each of the baffles 221 extends in the circumferential direction along an inner peripheral surface F1 of the tank body 21. The plurality of baffles 221 are connected to each other by the connecting members 222.

The connecting member 222 extends in the axial direction of the tank body 21. The connecting member 222 is a rod-shaped member. The sectional shape of the connecting member 222 is not particularly limited, and may be, for example, a circular shape or a polygonal shape. The connecting member 222 may be hollow or solid. The number of the connecting member 222 is not particularly limited. For example, a plurality of connecting members 222 are arranged at intervals in the circumferential direction. In the example of FIG. 2 and FIG. 3, the connecting members 222 penetrate through each of the baffles 221. Specifically, a through hole extending in the axial direction is formed in a member forming each of the baffles 221, and the connecting member 222 is inserted through the through hole. Alternatively, the connecting member 222 may not penetrate through each of the baffles 221. Each of the baffles 221 is mounted on the connecting member 222 by, for example, welding, bolt fastening, or the like.

The plurality of baffles 221 include end baffles 221A and normal baffles 221B. The end baffles 221A are the baffles 221 located at both ends in the axial direction among the plurality of baffles 221. The normal baffles 221B are the baffles 221 other than the end baffles 221A among the plurality of baffles 221. In the example of FIG. 2, seven normal baffles 221B are provided. Alternatively, the number of the normal baffles 221B may be other than seven. In the example of FIG. 2, the plurality of baffles 221 are arranged at equal intervals. Alternatively, the plurality of baffles 221 may be arranged at unequal intervals.

The end baffle 221A is held on the inner peripheral surface F1 of the tank body 21. Specifically, the end baffle 221A is clamped by the inner peripheral surface F1 of the tank body 21. As illustrated in FIG. 3, an outer peripheral surface F2 of the end baffle 221A is in contact with the inner peripheral surface F1 of the tank body 21. The outer peripheral surface F2 of the end baffle 221A is pressed radially inward by the inner peripheral surface F1 of the tank body 21. Thus, the holding of the end baffle 221A by the tank body 21 is achieved.

Alternatively, the holding of the end baffle 221A by the tank body 21 may be achieved by a force in a direction other than the radially inward direction (for example, an axial force). The holding of the end baffle 221A by the tank body 21 is achieved by, for example, spinning as described later. In the example of FIG. 2 and FIG. 3, the end baffle 221A is held on a portion, which extends in the axial direction, of the inner peripheral surface F1 of the tank body 21. Alternatively, the end baffle 221A may be held on a portion, which is reduced in diameter toward an end side, of the inner peripheral surface F1 of the tank body 21.

The baffle structure 22 is held on the tank body 21 when the end baffles 221A are held on the inner peripheral surface F1 of the tank body 21. Thus, the end baffles 221A are provided mainly in order to cause the baffle structure 22 to be held on the tank body 21. From the viewpoint of increasing the strength of the end baffle 221A, an axial thickness of the end baffle 221A is larger than an axial thickness of the normal baffle 221B. Alternatively, the axial thickness of the end baffle 221A may be the same as the axial thickness of the normal baffle 221B, or may be smaller than the axial thickness of the normal baffle 221B.

Figure 3:
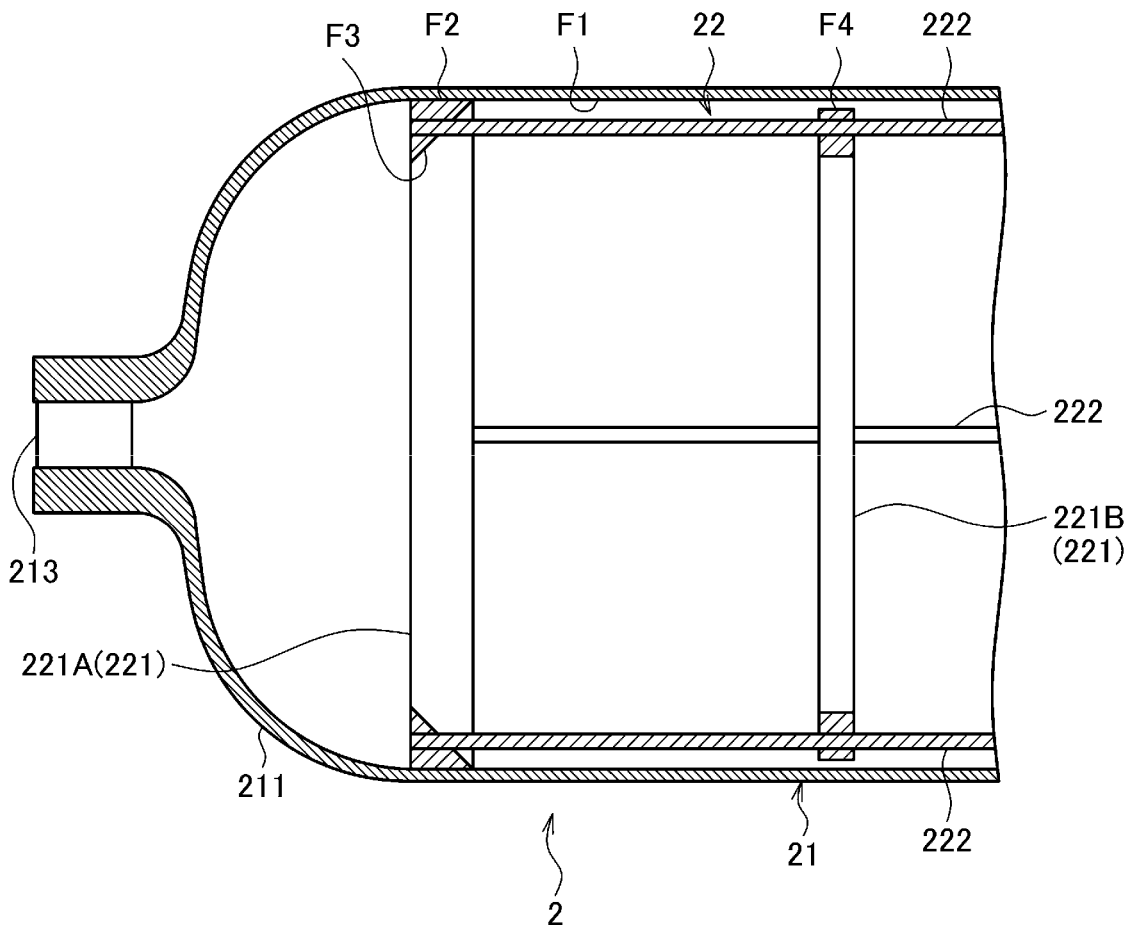
FIG. 3 is an enlarged sectional view for illustrating the oxidant tank according to this embodiment.

As illustrated in FIG. 3, an inclined surface F3 that is inclined with respect to the axial direction is formed on a surface other than the outer peripheral surface F2 of the end baffle 221A. In the example of FIG. 3, the inclined surface F3 is inclined radially inward as the incline surface F3 approaches the opening 213. With this configuration, when the inside of the tank body 21 is cleaned with a cleaning liquid, and the cleaning liquid is discharged from the opening 213 to the outside of the tank body 21, the cleaning liquid present on the opening 214 side with respect to the end baffle 221A is smoothly discharged along the inclined surface F3. Thus, the cleaning liquid inside the tank body 21 is prevented from being dammed up by the end baffle 221A to remain inside the tank body 21. As a result, the cleaning liquid inside the tank body 21 is smoothly discharged to the outside of the tank body 21. Alternatively, the inclined surface F3 may be inclined radially inward with distance from the opening 213. In this case, when the cleaning liquid is discharged from the opening 214 to the outside of the tank body 21, the cleaning liquid present on the opening 213 side with respect to the end baffle 221A is smoothly discharged along the inclined surface F3.

A through hole extending in the axial direction may be formed in the end baffle 221A. For example, a plurality of through holes are formed in the end baffle 221A at intervals in the circumferential direction. With this configuration, when the inside of the tank body 21 is cleaned with a cleaning liquid, and the cleaning liquid is discharged from the opening 213 or the opening 214 to the outside of the tank body 21, the cleaning liquid inside the tank body 21 passes through the through holes formed in the end baffle 221A to be smoothly discharged. Thus, the cleaning liquid inside the tank body 21 is prevented from being dammed up by the end baffle 221A to remain inside the tank body 21. As a result, the cleaning liquid inside the tank body 21 is smoothly discharged to the outside of the tank body 21.

The normal baffles 221B are not held on the inner peripheral surface F1 of the tank body 21. When the normal baffles 221B are provided inside the tank body 21, sloshing of the oxidant 6 inside the tank body 21 is suppressed. Specifically, when a liquid surface of the oxidant 6 inside the tank body 21 fluctuates, the liquid surface of the oxidant 6 collides with the normal baffle 221B, thereby suppressing sloshing. Thus, the normal baffles 221B are provided in order to suppress sloshing of the oxidant 6 inside the tank body 21.

As illustrated in FIG. 3, an outer peripheral surface F4 of the normal baffle 221B is spaced apart from the inner peripheral surface F1 of the tank body 21. With this configuration, when the inside of the tank body 21 is cleaned with a cleaning liquid, and the cleaning liquid is discharged from the opening 213 or the opening 214 to the outside of the tank body 21, the cleaning liquid inside the tank body 21 passes through a region between the outer peripheral surface F4 of the normal baffle 221B and the inner peripheral surface F1 of the tank body 21 to be smoothly discharged. Thus, the cleaning liquid inside the tank body 21 is prevented from being dammed up by the normal baffle 221B to remain inside the tank body 21. As a result, the cleaning liquid inside the tank body 21 is smoothly discharged to the outside of the tank body 21.

A through hole extending in the axial direction may be formed in the normal baffle 221B. For example, a plurality of through holes are formed in the normal baffle 221B at intervals in the circumferential direction. With this configuration, when the inside of the tank body 21 is cleaned with a cleaning liquid, and the cleaning liquid is discharged from the opening 213 or the opening 214 to the outside of the tank body 21, the cleaning liquid inside the tank body 21 passes through the through holes formed in the normal baffle 221B to be smoothly discharged. Thus, the cleaning liquid inside the tank body 21 is prevented from being dammed up by the normal baffle 221B to remain inside the tank body 21. As a result, the cleaning liquid inside the tank body 21 is smoothly discharged to the outside of the tank body 21.

An inner diameter of the normal baffle 221B may be the same as or different from an inner diameter (that is, the minimum diameter of the inclined surface F3) of the end baffle 221A.

As described above, the oxidant tank 2 according to this embodiment includes the seamless tank body 21. Further, the baffle structure 22 is held on the tank body 21 when the end baffles 221A are held on the inner peripheral surface F1 of the tank body 21. With this configuration, the baffles 221 are provided inside the tank body 21 with simple structure. When there is a seam caused by welding, bolt fastening, or the like in the tank body 21, a manufacturing process of the oxidant tank 2 may tend to become redundant due to the necessity for designing in consideration of a weak point and a defect of welding, the necessity for inspection of welded portions of the oxidant tank 2, and the like. Meanwhile, in the oxidant tank 2 according to this embodiment, the tank body 21 is seamless, and the baffles 221 are provided inside the tank body 21 with simple structure. Thus, the designing in consideration of a weak point and a defect of welding and the inspection process of welded portions can be eliminated, with the result that the manufacturing process is shortened. With this configuration, a procurement period, manufacturing cost, and inspection cost of the oxidant tank 2 can also be reduced. Further, the oxidant tank 2 can be reduced in weight as compared to the case in which there is a seam caused by welding, bolt fastening, or the like in the tank body 21. Further, safety can be enhanced. Further, sloshing can be appropriately suppressed.

In the above-mentioned example, the end baffle 221A is clamped by the inner peripheral surface F1 of the tank body 21. Alternatively, the end baffle 221A may be welded to the inner peripheral surface F1 of the tank body 21. However, from the viewpoint of reducing the welded portions in the oxidant tank 2 to further shorten the manufacturing process of the oxidant tank 2, it is preferred that the end baffle 221A be clamped by the inner peripheral surface F1 of the tank body 21 as in the above-mentioned example. As a result, the procurement period, the manufacturing cost, and the inspection cost of the oxidant tank 2 can be further reduced. Further, the oxidant tank 2 can be further reduced in weight to enhance the safety.

In the above-mentioned example, among the plurality of baffles 221, the baffles 221 located at the both ends in the axial direction (that is, the end baffles 221A) are held on the inner peripheral surface F1 of the tank body 21. In this case, it is only required that at least one of the plurality of baffles 221 be held on the inner peripheral surface F1 of the tank body 21. For example, among the plurality of baffles 221, one or a plurality of baffles 221 located at positions other than the both ends in the axial direction may be held on the inner peripheral surface F1 of the tank body 21.

In the above-mentioned example, the plurality of baffles 221 are connected to each other by the connecting members 222. Alternatively, the connecting members 222 may be omitted from the configuration of the oxidant tank 2. In this case, each of the baffles 221 is held on the inner peripheral surface F1 of the tank body 21. However, from the viewpoint of reducing the portions (for example, welded portions) on which the baffles 221 are held in the oxidant tank 2, it is preferred that the plurality of baffles 221 be connected to each other by the connecting members 222. In particular, when the end baffles 221A (that is, the baffles 221 located at the both ends in the axial direction of the plurality of baffles 221) are held on the inner peripheral surface F1 of the tank body 21, and the baffle structure 22 is held on the tank body 21, the portions (for example, welded portions) on which the baffles 221 are held in the oxidant tank 2 are effectively reduced.

Figure 4:
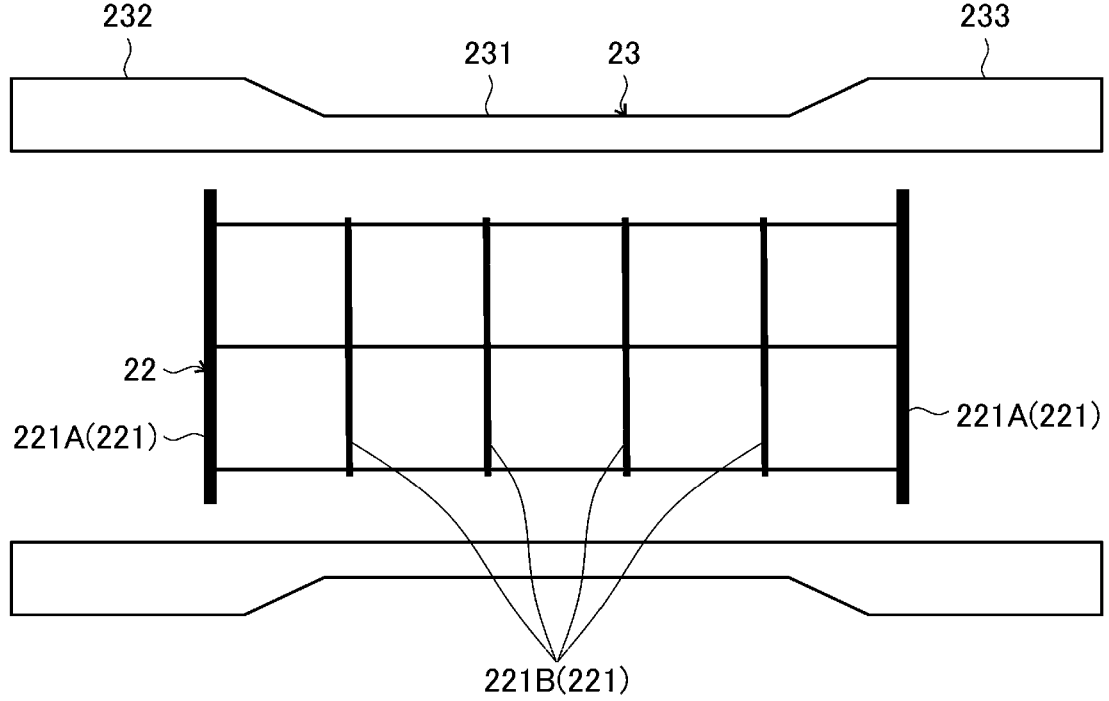
FIG. 4 is a schematic view for illustrating a state before spinning of a blank pipe of a tank body in this embodiment.
Figure 5:
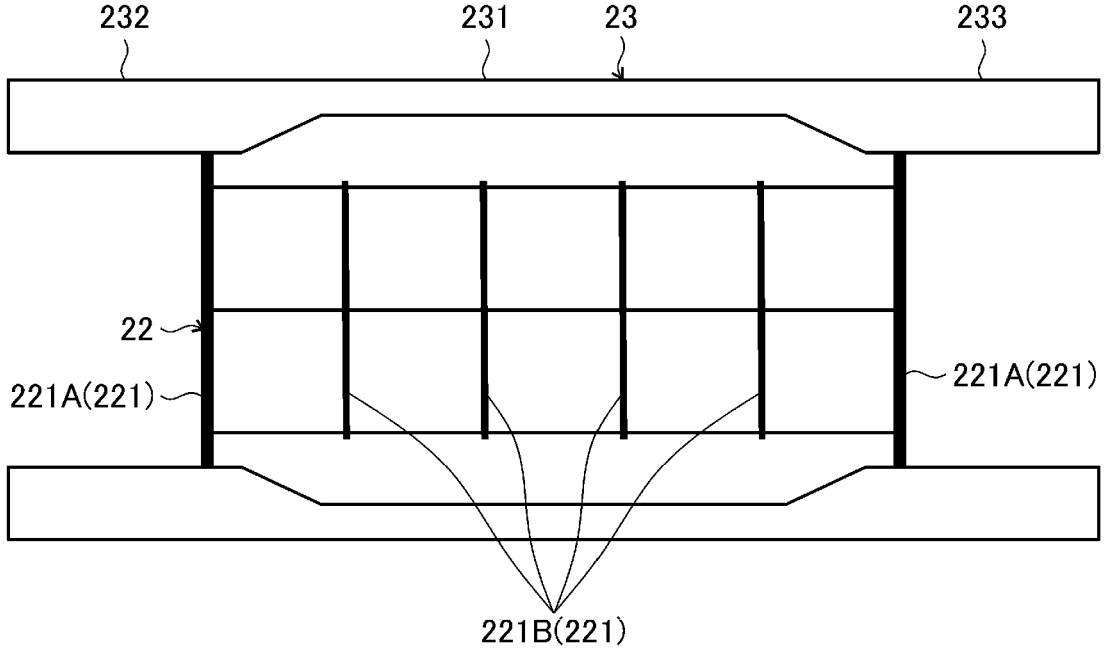
FIG. 5 is a schematic view for illustrating a state during spinning of the blank pipe of the tank body in this embodiment.
Figure 6:
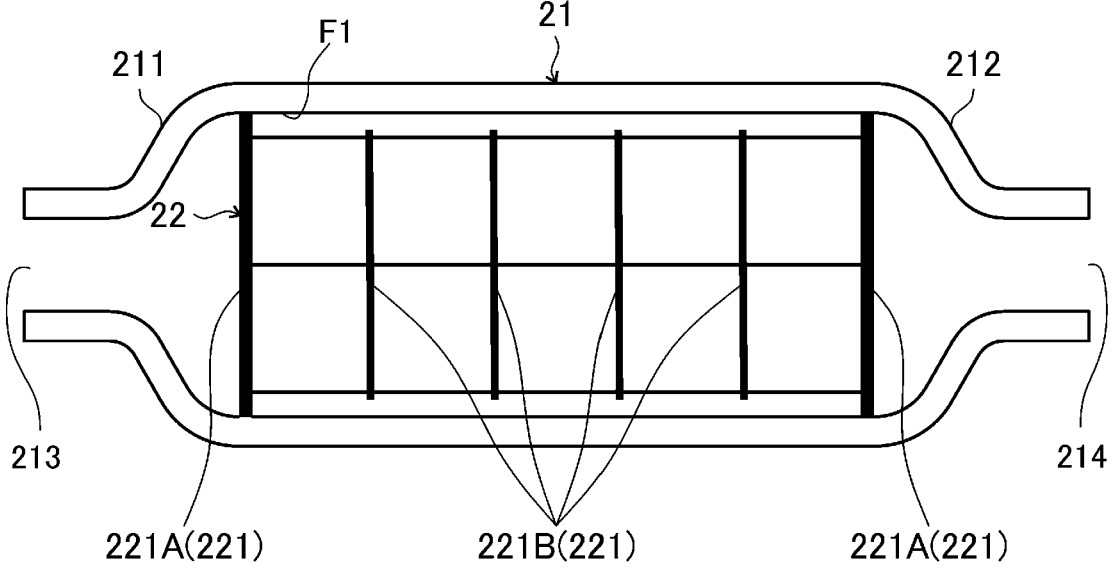
FIG. 6 is a schematic view for illustrating a state after spinning of the blank pipe of the tank body in this embodiment.

A method of manufacturing the oxidant tank 2 is described with reference to FIG. 4 to FIG. 6. In FIG. 4 to FIG. 6, for ease of understanding, each of constituent elements is simplified as compared to those in FIG. 2 and FIG. 3. For example, the number of the normal baffles 221B in the baffle structure 22 is reduced as compared to that of FIG. 2 and FIG. 3.

As described above, the tank body 21 is formed by, for example, spinning. The baffle structure 22 is installed inside a cylindrical blank pipe 23 before spinning is performed. After that, the blank pipe 23 is subjected to spinning to form the tank body 21.

FIG. 4 is a schematic view for illustrating a state before spinning of the blank pipe 23 of the tank body 21 in this embodiment. As illustrated in FIG. 4, a wall thickness of a center portion 231 in the axial direction of the blank pipe 23 is smaller than a wall thickness of both end portions 232 and 233 of the blank pipe 23. An inner diameter of the center portion 231 is the same as an inner diameter of the both end portions 232 and 233. An outer diameter of the center portion 231 is smaller than an outer diameter of the both end portions 232 and 233. The blank pipe 23 is formed by, for example, flow forming. The baffle structure 22 is installed inside such blank pipe 23 so that a direction in which the plurality of baffles 221 are arranged matches the axial direction of the blank pipe 23. Thus, the plurality of baffles 221 are installed inside the blank pipe 23 at intervals in the axial direction of the blank pipe 23. An axial position of each of the end baffles 221A is in the vicinity of an axial position of a connecting portion between the center portion 231 of the blank pipe 23 and each of the end portions 232 and 233 thereof. The baffle structure 22 is installed through use of, for example, a jig. The jig is removed at appropriate timing during spinning.

FIG. 5 is a schematic view for illustrating a state during spinning of the blank pipe 23 of the tank body 21 in this embodiment. FIG. 6 is a schematic view for illustrating a state after spinning of the blank pipe 23 of the tank body 21 in this embodiment. In spinning of the blank pipe 23, the blank pipe 23 is deformed by pressing a tool against the blank pipe 23 from a radially outer side while the blank pipe 23 is being rotated. Specifically, as illustrated in FIG. 5, in spinning of the blank pipe 23, the both end portions 232 and 233 of the blank pipe 23 are reduced in diameter toward respective end sides. Thus, the both end portions 232 and 233 of the blank pipe 23 clamp the end baffles 221A while being deformed. In FIG. 6, there is illustrated a state in which the formation of the tank body 21 is completed, and the end baffles 221A are held on the inner peripheral surface F1 of the tank body 21. As described above, the end baffles 221A are clamped by the inner peripheral surface F1 of the tank body 21 while the seamless tank body 21 is being formed by spinning.

As described above, the method of manufacturing the oxidant tank 2 includes installing the plurality of baffles 221 inside the cylindrical blank pipe 23 at intervals in the axial direction of the blank pipe 23. Further, the method of manufacturing the oxidant tank 2 includes, after installing the plurality of baffles 221 inside the blank pipe 23, reducing the both end portions 232 and 233 of the blank pipe 23 in diameter toward respective end sides to form the seamless tank body 21. With this configuration, the formation of the seamless tank body 21 and the provision of the plurality of baffles 221 inside the tank body 21 are appropriately achieved. Thus, the manufacturing process of the oxidant tank 2 is shortened. As a result, the procurement period, the manufacturing cost, and the inspection cost of the oxidant tank 2 can be reduced. Further, the oxidant tank 2 can be reduced in weight to enhance the safety. Further, sloshing can be appropriately suppressed.

In actuality, various steps, such as heat treatment, may be added to the method of manufacturing the oxidant tank 2 described above. In addition, in the method of manufacturing the oxidant tank 2 described above, the end baffles 221A are clamped by the inner peripheral surface F1 of the tank body 21 by subjecting the blank pipe 23 to spinning. Alternatively, the end baffles 221A may be welded to the inner peripheral surface F1 of the tank body 21 as described above. In addition, in the method of manufacturing the oxidant tank 2 described above, the blank pipe 23 is prepared by flow forming. Alternatively, the blank pipe 23 may be prepared by spinning. In addition, in the method of manufacturing the oxidant tank 2 described above, the both end portions 232 and 233 of the blank pipe 23 are reduced in diameter toward respective end sides by spinning. Alternatively, the both end portions 232 and 233 of the blank pipe 23 may be reduced in diameter toward respective end sides by flow forming.

Although the embodiment of the present disclosure has been described above with reference to the accompanying drawings, needless to say, the present disclosure is not limited to such embodiment. It is apparent that a person skilled in the art would be conceived of various modification examples or correction examples within the scope of the claims, and it is understood that these examples also inevitably belong to the technical scope of the present disclosure.

In the foregoing, description has been given of an example in which the liquid tank of the present disclosure is the oxidant tank 2 of the rocket 1 that is a hybrid rocket. Alternatively, the liquid tank of the present disclosure may be a liquid tank of a rocket other than the hybrid rocket. For example, the liquid tank of the present disclosure may be an oxidant tank or fuel tank of a liquid rocket including a liquid oxidant and a liquid fuel. In addition, the liquid tank of the present disclosure may be a liquid tank of a device (for example, a vehicle) other than the rocket.

In this case, when the size of the rocket in which the liquid tank of the present disclosure is used is smaller, the present disclosure is more effectively utilized. The wall thickness of the liquid tank hardly changes irrespective of the size of the rocket. Thus, in a large-size rocket, the ratio of the weight of the liquid tank in the entire rocket becomes smaller as compared to that of a small-size or medium-size rocket. Meanwhile, in the small-size or medium-size rocket, the ratio of the weight of the liquid tank in the entire rocket becomes larger as compared to that of the large-size rocket. Thus, in the small-size or medium-size rocket, the reduction in weight of the liquid tank is further desired.

The invention claimed is:

1. A liquid tank, comprising:
a tank body having both end portions being reduced in diameter toward respective end sides, the tank body has a cylindrical part, and the entire tank body is seamless; and
annular baffles provided inside the tank body and arranged at intervals in an axial direction of the tank body, in which at least one of the baffles is held on an inner peripheral surface of the tank body,
wherein the baffles include end baffles held on the inner peripheral surface of the tank body and normal baffles having an outer peripheral surface spaced apart from the inner peripheral surface of the tank body, wherein the end baffles and the normal baffles are arranged coaxially, wherein the baffles are connected to each other by a connecting member which is a rod-shaped member extending in the axial direction.

2. The liquid tank according to claim 1, wherein the end baffles are clamped by the inner peripheral surface of the tank body.

3. A rocket comprising the liquid tank of claim 2.

4. The liquid tank according to claim 1, wherein the end baffles are located at both ends in the axial direction among the baffles.

5. A rocket comprising the liquid tank of claim 4.

6. The liquid tank according to claim 1, wherein an inclined surface inclined with respect to the axial direction is formed on a surface other than an outer peripheral surface of the end baffles.

7. A rocket comprising the liquid tank of claim 6.

8. A rocket comprising the liquid tank of claim 1.

9. A method of manufacturing a liquid tank, comprising:

installing annular baffles inside a cylindrical blank pipe at intervals in an axial direction of the blank pipe; and after installing the baffles inside the blank pipe, reducing both end portions of the blank pipe in diameter toward respective end sides to form a seamless tank body, wherein the tank body has a cylindrical part, and the entire body is seamless, wherein at least one of the plurality of baffles is held on an inner peripheral surface of the tank body, wherein the baffles include end baffles held on the inner peripheral surface of the tank body and normal baffles having an outer peripheral surface spaced apart from the inner peripheral surface of the tank body, wherein the end baffles and the normal baffles are arranged coaxially, wherein the baffles are connected to each other by a connecting member which is a rod-shaped member extending in the axial direction.

* * * * *